US008184777B1

(12) United States Patent
Larkin

(10) Patent No.: US 8,184,777 B1
(45) Date of Patent: May 22, 2012

(54) BUTTSET TEST CABLE REEL

(75) Inventor: Kevin B. Larkin, Pebble Beach, CA (US)

(73) Assignee: Kevin B. Larkin, Santa Cruz, CA (US)

( * ) Notice: Subject to any disclaimer, the term of this patent is extended or adjusted under 35 U.S.C. 154(b) by 538 days.

(21) Appl. No.: 12/023,444

(22) Filed: Jan. 31, 2008

(51) Int. Cl.
*H04M 1/24* (2006.01)
*H04M 3/08* (2006.01)
*H04M 3/22* (2006.01)

(52) U.S. Cl. ..................... 379/21; 379/29.01
(58) Field of Classification Search .............. 379/433.01, 379/433.05, 434, 438, 30, 29.05, 23, 22.07; 242/376, 378, 378.4, 379, 385, 385.1, 385.4, 242/388.6, 388.3; 191/12.2 R, 12.4, 12.2 A
See application file for complete search history.

(56) References Cited

U.S. PATENT DOCUMENTS

| | | | |
|---|---|---|---|
| 5,128,993 A | 7/1992 | Skowronski | |
| 5,299,670 A | 4/1994 | Willard | |
| 5,710,812 A | 1/1998 | Fogel | |
| 5,718,310 A | 2/1998 | Gallo | |
| 6,019,304 A * | 2/2000 | Skowronski et al. | 242/373 |
| 6,324,285 B1 | 11/2001 | Dowsett et al. | |
| 6,542,757 B2 | 4/2003 | Bae | |
| 6,554,218 B2 * | 4/2003 | Buyce et al. | 242/388.6 |
| 6,567,651 B2 | 5/2003 | Whitley | |
| 6,578,683 B1 * | 6/2003 | Burke et al. | 191/12.4 |
| 6,679,448 B1 * | 1/2004 | Carpenter et al. | 242/385.3 |
| 6,712,304 B1 | 3/2004 | Taylor | |
| 6,731,956 B2 | 5/2004 | Hanna et al. | |
| 6,874,722 B2 * | 4/2005 | Wei | 242/378 |
| 6,970,534 B1 * | 11/2005 | Brumble | 379/21 |
| 7,108,216 B2 * | 9/2006 | Burke et al. | 242/378.1 |
| 2003/0016818 A1 | 1/2003 | Kuo | |
| 2004/0223592 A1 * | 11/2004 | Diggle et al. | 379/21 |

* cited by examiner

*Primary Examiner* — Davetta W Goins
*Assistant Examiner* — Phylesha Dabney
(74) *Attorney, Agent, or Firm* — Morgan, Lewis & Bockius LLP

(57) ABSTRACT

A test cable is spooled on a spring loaded cable reel that is structurally connected to a buttset via an anchor that holds on to a cable outlet of the buttset housing. A releasable ratchet holds the spool against a reeling spring such that the pulled out test cable may be conveniently handled without cable tension. To retract the test cable, the ratchet may be released by a small pull on the test cable. A number of such cable reels may be stacked inside a compact housing. Existing buttsets may be easily retrofitted by merely replacing its strain relief and dangling test cable. As a favorable result, test cable damage due to its wrapping around the buttset is avoided while test cable handling is optimized.

14 Claims, 8 Drawing Sheets

BUTTSET TEST CABLE REEL

FIELD OF INVENTION

The present invention relates to test cable reels of and for handheld telephone line testing devices commonly referred to as buttsets.

BACKGROUND OF INVENTION

Field testing of telephone and/or telecommunication lines is commonly performed by use of compact handheld telephone line testing devices, which are commonly referred to as buttsets. As depicted in Prior Art FIGS. 1 and 2, such a buttset 1 may have an overall appearance like a bulky old style telephone receiver with a central thin handle connecting two opposite and more massive end portions. A prior art buttset 1 may include well known testing circuitry, power supply, display, keyboard and switches omitted in the Figs. for clarity. A prior art buttset 1 is commonly connected to well known test terminals via one or more dangling test cable 7 and dangling test connector 9. The dangling test cable 7 is connected to well known test circuitry inside the buttset 1 and extends out of the buttset 1 interior through a strain relieve 8, which in turn is fixed in a cable outlet 3 of the housing 4, 5. The strain relieve 8 transfers externally induced test cable 7 strains and loads onto the housing.

Between uses, the loosely hanging test cable 7 is commonly wrapped around the buttset 1 housing 4, 5. While loosely wrapped around the housing 4, 5, the cable 7 is heavily exposed to wear and damage during handling and transportation. It also may easily fall of the buttset 1 making it time consuming to unwrap it for the next job. In addition, the repeated bending strain on the dangling test cable 7 in the vicinity of the strain relieve 8 introduces additional wear and unpredictable breaking of the test cable 7. Moreover and as observed by the present inventor, buttset 1 operators commonly tend to speed up the unwinding of the wrapped up test cable 7 by simply dropping the buttset 1 while holding the test connector 9. While the buttset 1 accelerates towards the ground, it spins the wrapped test cable 7 free to its full length. At the moment the test cable 7 is straightened out, the buttset 1 may be abruptly stopped from its free fall while the test cable 7 may be exposed to tremendous sudden tensile loads.

There have been repeated design attempts made in the industry to enforce the strain relief 8 and its connection with the housing 4, 5 to deal with the above explained test cable's 7 excessive strains and loads. Nevertheless, simply structurally enforcing the strain relief 8 and its housing 4, 5 connection does not eliminate the source of the excessive test cable 7 loads and strains. Therefore, there exists a need for an apparatus that reduces the risks of unpredictable failure of the test cable 7 commonly related to repeated wrapping around the buttset 1 and any other mishandling related to the loosely hanging of the test cable 7 as explained above. The present invention addresses these needs.

A buttset is an expensive electronic device. Therefore, there exists also a need for an accessory that may be conveniently assembled on existing buttsets an that provides compact housing and ergonomic access to the test cable. The present invention addresses also this need.

SUMMARY OF INVENTION

A cable reel is structurally connected with the buttset and the test cable is reel able connected with the cable reel such that it may be conveniently spooled off to the needed length and reeled in again automatically. The cable reel may feature a reeling spring and a releasable unreeling ratchet that counteracts the reeling spring. The test cable may be conveniently pulled off the cable reel against the reeling spring's torque. The releasable ratchet locks the spool at the desired pulled off length of the test cable such that the test cable can be handled without cable tension. The ratchet may be released via a small pull such that the reeling spring may reel in again the test cable. On a spool of the cable reel is a rotating contact slider that is in circumferentially continuous contact with a stationary contact. A buttset connector cable is conductively connected with the test cable lead across the sliding contact pair. The buttset connector cable itself is connected to the buttset's interior circuitry.

The cable reel may be housed inside the main buttset housing or may be externally attached via a buttset connector that is withholding itself with an anchor in the cable outlet. Through the attached anchor, the buttset connector cable may extend inside the buttset housing. The buttset cable reel extension may be conveniently assembled to existing buttsets by merely replacing the conventional dangling test cable together with the conventional strain relief.

The housing of the buttset cable reel extension may have an outside contour in projection direction of the cable outlet that is not larger than the cable outlet projected contour of the cable outlet face. In that way, both the buttset and the attached cable reel extension maintain a compact overall size and shape for easy handling and storage while the test cable is securely stored and easy access with minimal risks of test cable damage. A number of cable reels may be stacked inside the compact housing.

BRIEF DESCRIPTION OF THE FIGURES

Prior Art

Prior Art

DETAILED DESCRIPTION

Figure 1:
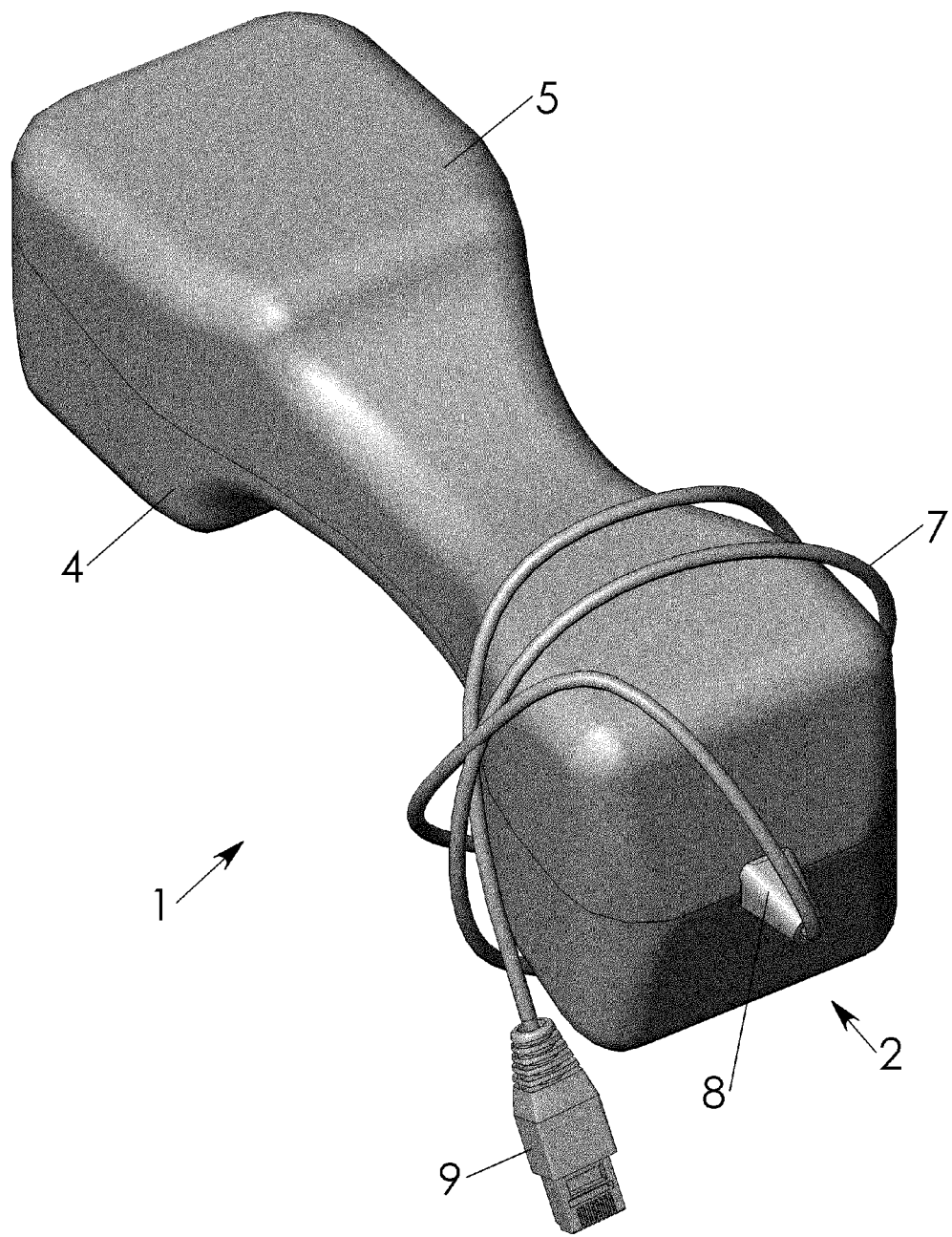
FIG. 1 is a first perspective view of a prior art buttset including strain relieve and dangling test cable wrapped around the buttset.
Figure 2:
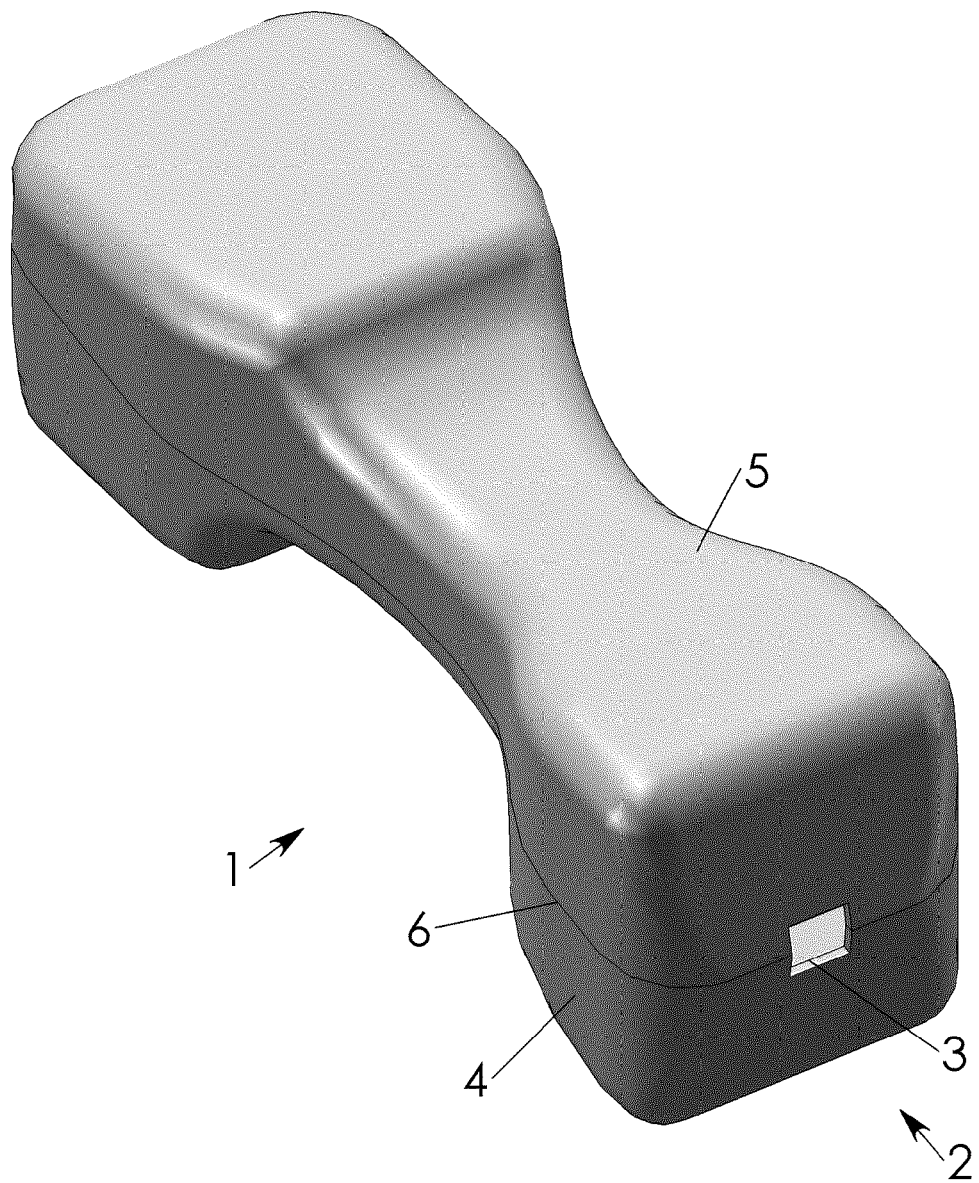
FIG. 2 is the first perspective view of the buttset of FIG. 1, without strain relieve and dangling test cable.

Referring to Prior Art FIGS. 1 and 2, a well known handheld telephone line testing device commonly referred to as buttset 1 typically includes a housing 4, 5 having two or more portions. Representatively depicted are housing bottom portion 4, and housing top portion 5 fitting together along a parting line 6. At a cable outlet face 2, a strain relieve 8 is combined with the housing 4, 5 via a cable outlet 3. The strain relieve 8 is commonly in the middle of the cable outlet face 2 or in other words, the cable outlet face 2 may surround the cable outlet 3 and may be that portion of the housing 4, 5 the faces substantially in protrusion direction of the cable outlet 3.

The cable outlet 3 is commonly a profiled hole in the housing 4, 5 with eventual other well known structural features or separate components configured for securing the strain relief 8 with respect to the housing 4, 5. In that way and as is well known in the art, tensile and bending loads exerted via the dangling test cable 7 onto the strain relief 8 are transferred onto the housing 4, 5.

Figure 3:
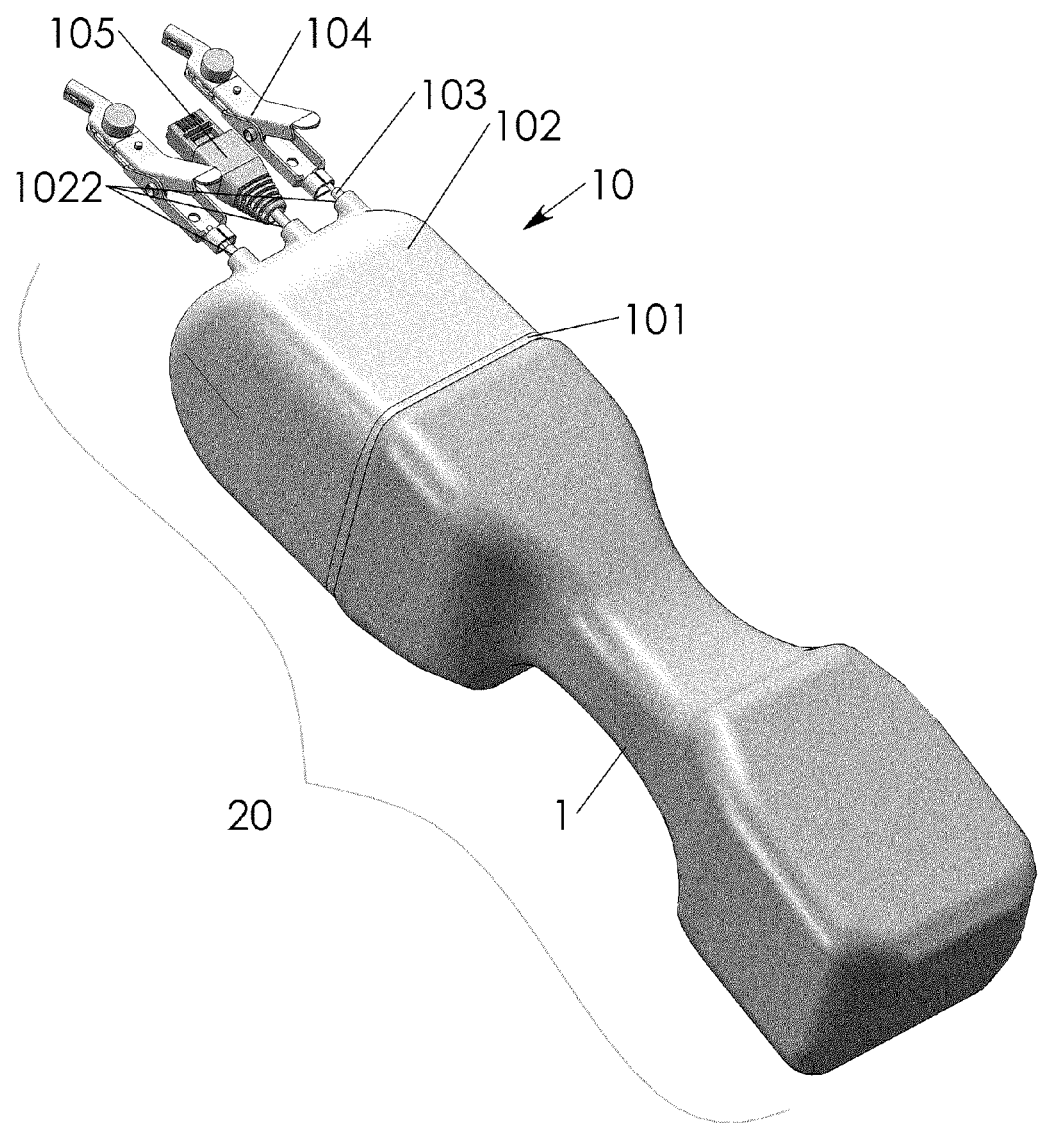
FIG. 3 is a second perspective view of a preferred embodiment of the invention assembled to the prior buttset of FIG. 2.
Figure 4:
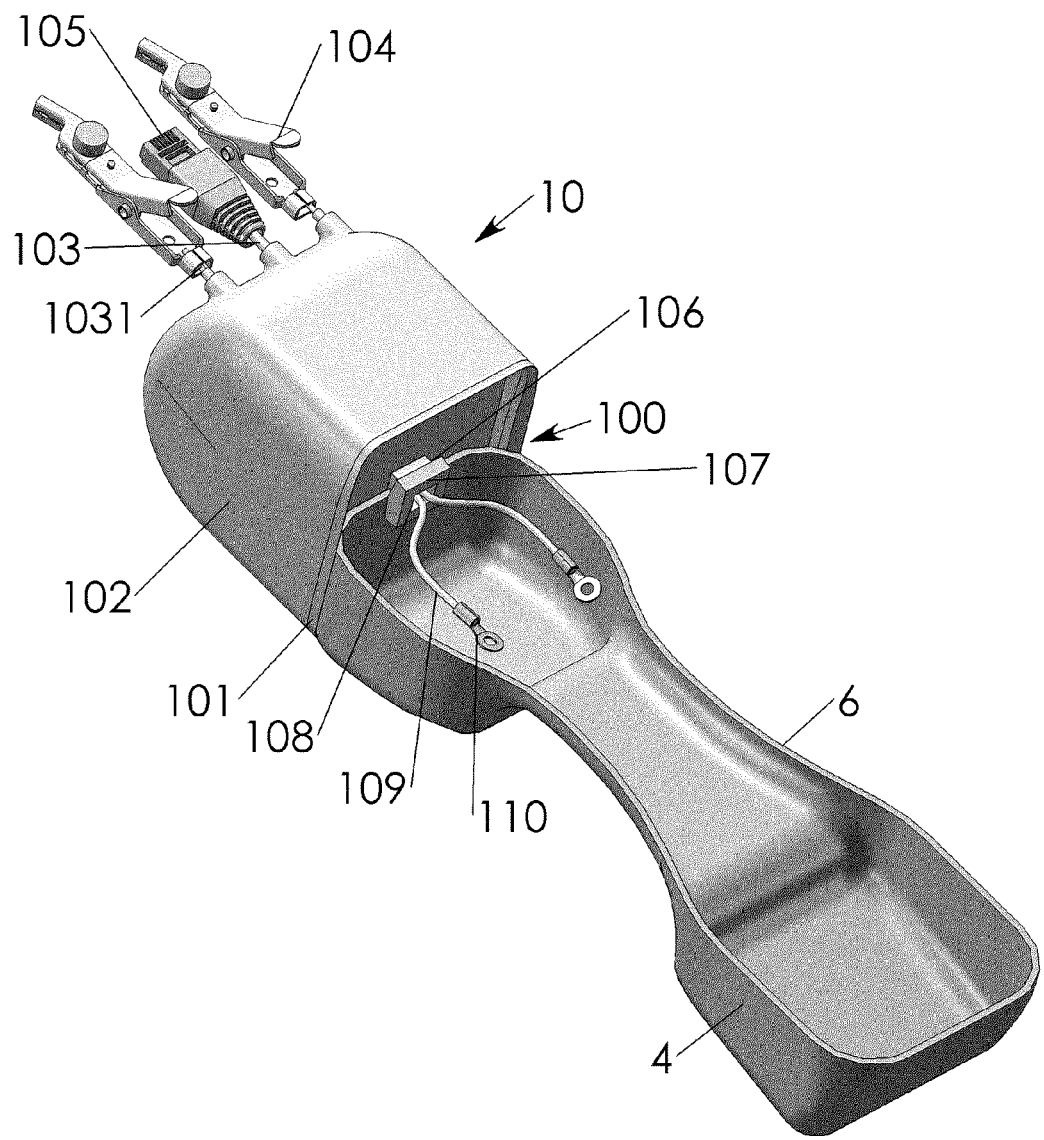
FIG. 4 is the second perspective view of the invention as in FIG. 3 with only a bottom housing portion of the prior art buttset of FIG. 2.
Figure 5:
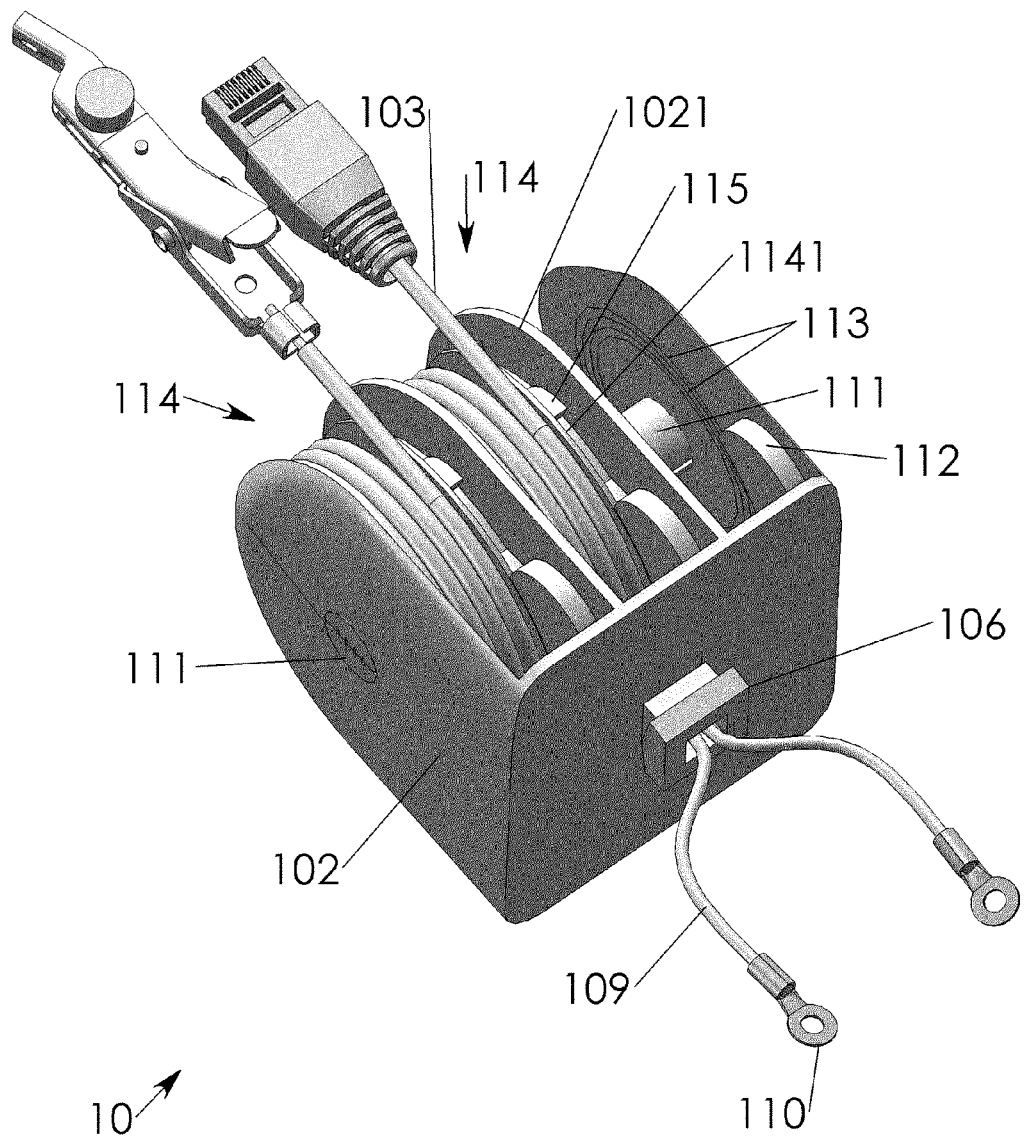
FIG. 5 is a third perspective view of the preferred embodiment of the invention without encapsulating housing portions.
Figure 6:
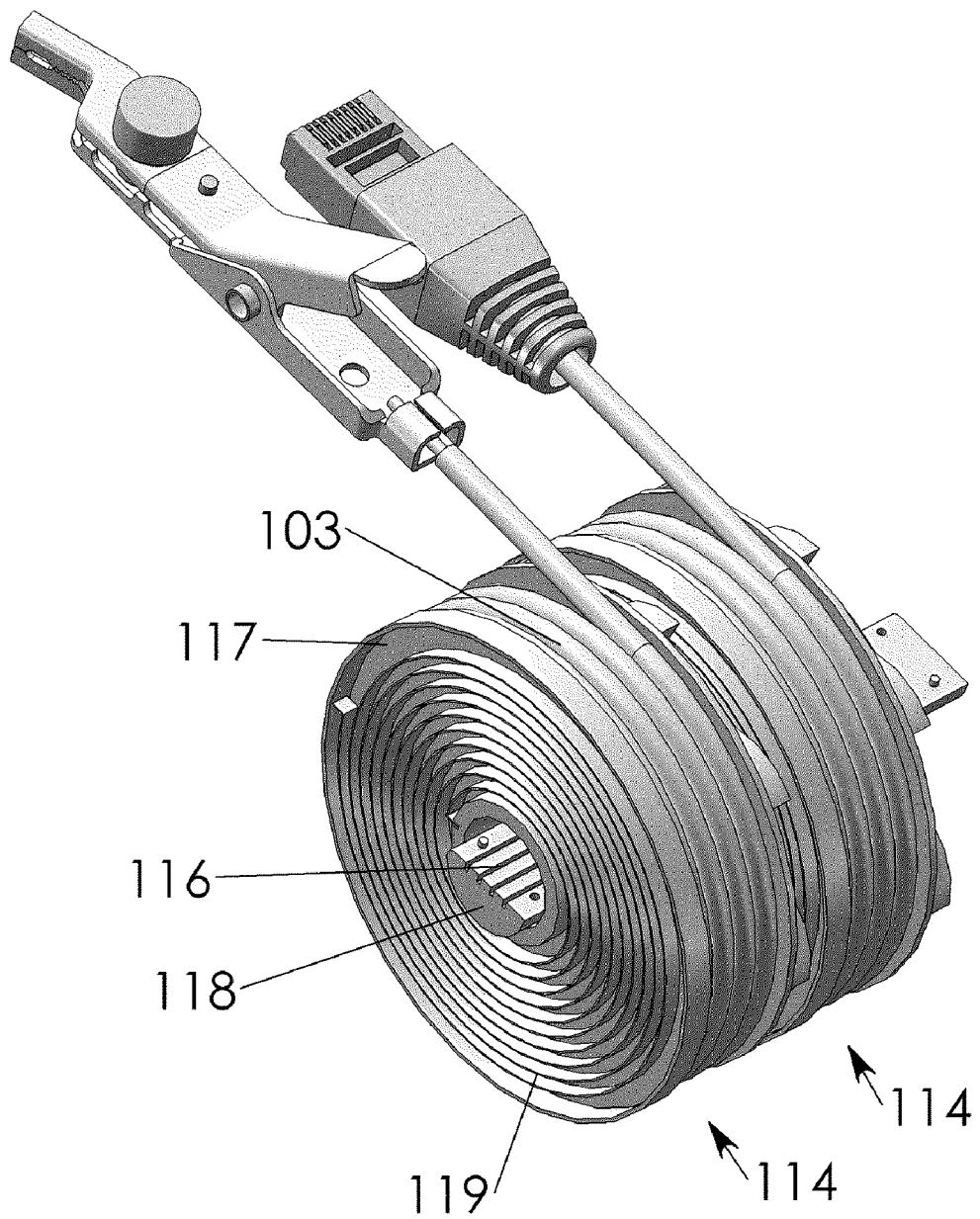
FIG. 6 is the second perspective view of portions of the preferred embodiment invention.
Figure 7:
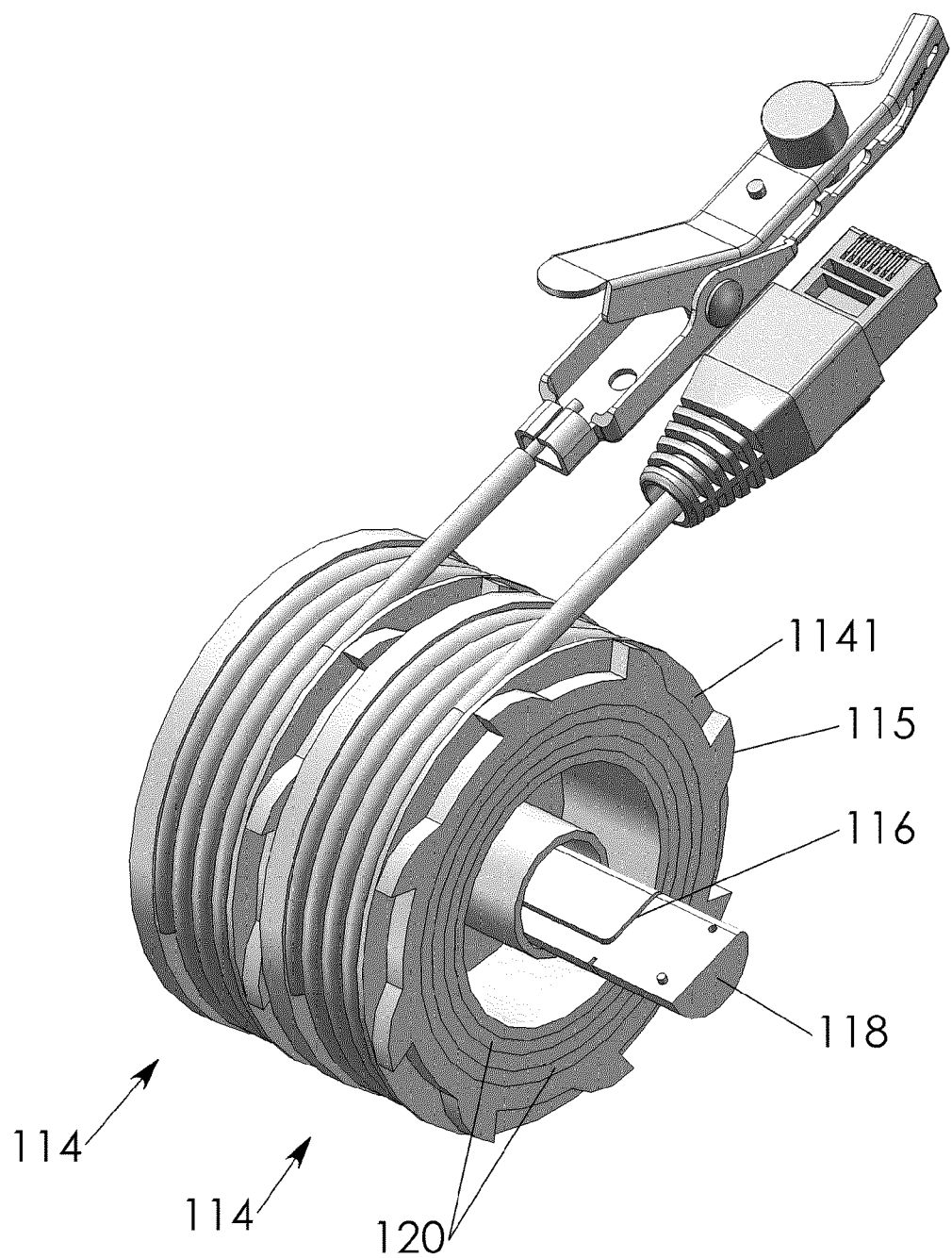
FIG. 7 is a fourth perspective view of FIG. 6 contents.
Figure 8:
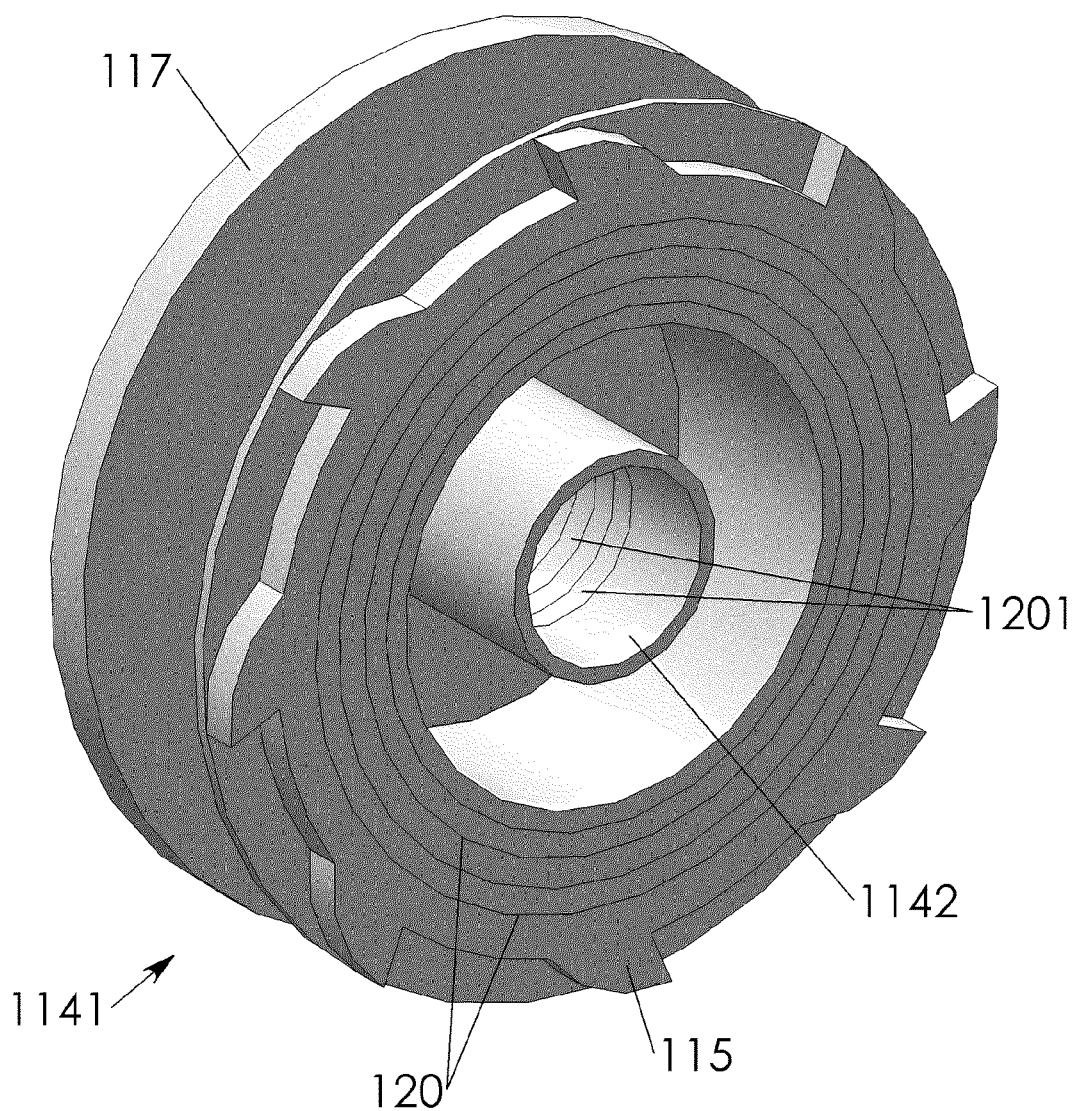
FIG. 8 is a fifth perspective view of a cable drum of the cable reel.

As depicted in FIGS. 3, 4 and in accordance with a preferred embodiment of the invention, a buttset cable reel extension 10 may be configured to be attached to the buttset 1 via an anchor 100. The anchor 100 may feature an anchor head 107 that is withholding itself at the inside of the cable outlet 3 while the anchor 100 is attached and while the buttset 1 housing 4, 5 is assembled. Also part of the anchor 100 is an anchor shaft 106 that positions the anchor 100 with respect to the cable outlet 3 and the buttset 1 while the anchor 100 is attached. Anchor shaft 106 and anchor head 107 may be configured in conjunction with other well known design particularities of varying cable outlets 3 and any eventual affiliated buttset 1 components commonly employed in the immediate vicinity of the cable outlet 3 for the original purpose of securing the strain relieve 8.

Additional positioning of the housing 102 on the buttset 1 may be provided by employing a mating feature 101 configured to snugly press against at least a portion of the cable outlet face 2 while the anchor 100 is attached to the cable outlet 3. The mating feature 101 may be of elastic plastic material. The overall housing 102 may have an outside contour in protrusion or projection direction of the cable outlet 3 that is not larger than a cable outlet 3 projected contour of the cable outlet face 2. As a result, the combined buttset 1 and buttset cable reel extension 10 are highly compact in shape, easy to store and ergonomically handled.

A number of buttset connector cables 109 extend through an anchor through hole 108 out of the distal end of the anchor 100 such that they are within the buttset 1 housing 4, 5 while the anchor 100 is attached to the cable outlet 3. The buttset connector cable(s) 109 may feature at their respective distal ends well known crimping lugs 110 or the like for conductively connecting them to the buttset's 1 well known interior electronic circuitry.

Referring also to FIGS. 5-8, the buttset connector cables 109 are conductively connected to a stationary contact slider 113 or 116 inside a housing 102 of the buttset cable reel extension 10. The stationary contact slider 113 or 116 is together with a rotating contact slider 120 part of sliding contact pair positioned in an interface between a rotating cable drum 1141 and a stationary part 118 or 120 of the buttset cable reel extension 10. The stationary part may be a housing wall 1021 adjacent the cable drum 1141 or a cable reel axle 111.

The stationary contact slider 113 or 116 is/are in a circumferentially continuous contact with the rotating contact slider 120 or 1201. The rotating contact slider 120 or 1201 is/are conductively connected to a lead 1031 of a test cable 103. The stationary contact slider 116 is placed on the circumference of the cable reel axle 111. The stationary contact slider 113 is placed on a housing wall 1021 immediately adjacent the respective cable drum 1141. Conductive pairs 116/1201 or 113/120 may be alternately or combined employed dependent on the number of leads 1031 per test cable 103 and other design constrains as may be well appreciated by anyone skilled in the art.

To facilitate stationary contact sliders 116 for example, the cable reel axle 111 may be split into two axle halves 118 such that buttset connector cables 109 may be conductively connected with the stationary connectors 116 within the housing 102 and within the cable reel axle 111 as may be well appreciated by anyone skilled in the art. To facilitate stationary contact sliders 113 for example, the buttset connector cables 109 may be conductively connected with the stationary connectors 113 within the housing 102 and within the housing wall 1021 as may be well appreciated by anyone skilled in the art. At least one of the stationary contact sliders 113, 116 and/or rotating contact sliders 120, 1201 may be substantially circumferentially continuous.

The test cable 103 is spooled on the cable drum 1141, which may also feature circumferential ratchet teeth 115 that are part of and correspond with an unreeling ratchet 112 acting in opposition to a reeling spring 119. The reeling spring 119 may be recessed in a spring cavity 117 of the cable drum 1141 and engage with one of its ends with the cable drum 1141 and with the other of its two ends with a stationary part such as the housing 102 or cable reel axle 111. The reeling spring 119 exerts a torque on the cable drum 1141 that causes the cable drum 1141 to automatically reel in the respective unreeled test cable 103 when the unreeling ratchet 112 is released. The unreeling ratchet 112 may be released by a small pull on the test cable 103. Small pull in context with the present invention is a pull on the test cable 103 with substantially less than the pitch between adjacent ratchet teeth 115. The release mechanism of the unreeling ratchet 112 may operate in a well known fashion for example by employing a well known Mohawk gear. The reeling spring 119 may spool the respective test cable 103 in to the point where the respective test connector 104, 105 comes to rest against the spooled cable outlet 1022.

The buttset cable reel extension 10 may feature a number of cable reels 114 stacked inside the housing 102 adjacent on the cable reel axle 111. Number of cable reels 114 may be selected in conjunction with requirements for varying numbers and/or types of test connectors 104, 105. For example and as depicted in the Figs., there may be three cable reels 114 of which the two outer ones spool single lead test cables 103 at the end of which clamp connectors 104 may provide single contact test connection. A third cable reel 114 in the middle may spool a multiple lead 1031 test cable 103 at the end of which a well known RJ' connector 105 may be attached to connect to a standard telephone jack. Single ones of the buttset connector cables 109 may be connected to multiple leads of the three cable reels 114 as may be clear to anyone skilled in the art. The buttset connector cables 109 may be guided inside the housing 102 and connected to the stationary sliding contacts 113 and/or 116 in a well known fashion.

To attach the buttset cable reel extension 10 to a prior art buttset 1, the respective housing portions 4, 5 are initially disassembled and the original dangling test cable(s) 7 and the strain relief 8 removed. In place of the strain relief 8 is the anchor 100 positioned and the buttset connector cables 109 connected to the buttset's 1 well known interior circuitry. Eventual additional original strain relief 8 locking parts may be employed to lock the anchor 100 in place before the buttset 1 housing parts 4, 5 are put together again. The buttset 1 housing 4, 5 is depicted as example in the Figs. The scope of the invention is not limited by a particular configuration of the buttset 1 housing as long as a cable outlet 3 is available as described above.

The preferably elastic mating feature 101 on one hand may ease the reassembly of the housing portions 4, 5 in the presence of the attached housing 102. Once the original buttset 1 housing 4, 5 is reassembled with the anchor 100 fixed in the cable outlet 3, the buttset cable reel extension 10 is in a solid connection with buttset 1. At the same time, a certain flexibility in the interface between the two housings 102 and 4, 5 may reduce the risk of damage in case of sudden and inadvertent impact. The flexibility in the interface is accomplished by the central pull withstanding fix of the anchor 100 and the elastic snug contact of the mating feature 101 with cable outlet face 2. Notwithstanding the preferred configuration of the housings interface, additional attachment features such as screws and the like may be employed.

In an alternate embodiment of the invention, a number of cable reels 114 may be directly structurally connected to a modified buttset 20 and housed inside of it. Such a modified buttset 20 may have a continuous housing shape corresponding to the combined shapes of housing 102, 4, 5, as may be well recognized from the FIG. 3.

During operational use, one or more of the test cables 103 may be simply pulled out of the housing 102 via the test connectors 104, 105 against the torque of the reeling spring(s) 119. Once the test cable(s) 103 are pulled out to the desired length, the unreeling ratchet(s) 112 engage with one of the circumferential ratchet teeth 115 and the respective cable drum(s) 1141 may be automatically held against the reeling spring's 119 torque. The test cable(s) 103 may be used free of tensile load. Once the test cable(s) 103 need to be retracted again, a small pull initiated by the operator on the respective test cable(s) 103 may release the unreeling ratchet(s) 112 and the test cable(s) 103 are spooled back in automatically.

Spooled cable outlets 1022 of the housing 102 are preferably positioned and pointing in a direction with respect to the buttset 1 such that the test connectors 104 are also within the cable outlet projected contour of the cable outlet face 2 while the test cable(s) 103 are fully spooled in and while the buttset cable reel extension 10 is attached to the buttset 1. In that way, the buttset 1 with the attached buttset cable reel extension 10 may be easily stored and stacked without risk of cable break in the vicinity of the test connectors 104, 105. The same may apply to the alternate embodiment including the modified buttset 20.

Accordingly, the scope of the invention described in the Figures and the above specification is set forth by the following claims and their legal equivalent:

What is claimed is:

1. A buttset cable reel extension comprising:
a mating feature for contacting a portion of a buttset;
at least one rotatable cable reel supported by an axle, the axle rigidly coupled to the mating feature;
a housing at least partially enclosing the at least one rotatable cable reel;
a buttset connector cable; and
an attachment mechanism configured to maintain the mating feature in contact with the portion of the buttset, wherein the attachment mechanism is an anchor, the anchor comprising:
an anchor shaft with a first end and a second end remote from the first end, the second end connected with the buttset cable reel extension, wherein at least a portion of the anchor shaft is configured to fit within an opening in a buttset housing;
an anchor head at the first end of the anchor shaft, wherein the anchor head comprises at least one surface configured to contact an inner portion of the buttset housing in an area proximate to the opening so as to retain the anchor head substantially inside the buttset housing.

2. The buttset cable reel extension of claim 1, wherein said at least one rotatable cable reel comprises a rotating contact slider.

3. The buttset cable reel extension of claim 2, wherein said rotating contact slider is substantially circumferentially continuous around a portion of the at least one rotatable cable reel.

4. The buttset cable reel extension of claim 2, further comprising a stationary contact configured to contact the rotating contact slider of the at least one rotatable cable reel, wherein the stationary contact is substantially circumferentially continuous.

5. The buttset cable reel extension of claim 4, wherein said stationary contact is coupled to the axle.

6. The buttset cable reel extension of claim 4, wherein said stationary contact is coupled to the housing.

7. The buttset cable reel extension of claim 1, wherein said mating feature is an elastic plastic material.

8. The buttset cable reel extension of claim 1, wherein said at least one rotatable cable reel comprises an unreeling ratchet and a reeling spring.

9. The buttset cable reel extension of claim 8, wherein said unreeling ratchet is releasable in response to a cable extension force applied to a test cable attached to the rotatable cable reel.

10. The buttset cable reel extension of claim 1, wherein the housing comprises a cable outlet to allow a test cable to extend from the at least one rotatable cable reel to an outside of the housing.

11. The buttset cable reel extension of claim 1, wherein the axle is disposed perpendicular to a longitudinal axis defined by a handle of the buttset.

12. The buttset cable reel extension 1, further comprising:
a buttset connector cable extending between an interior and an exterior of the housing through an anchor through hole in the anchor shaft.

13. The buttset cable reel extension of claim 1, wherein the anchor is configured to couple to a pre-existing cable outlet disposed at a cable outlet face of the buttset.

14. The buttset cable reel extension of claim 1, wherein the at least one rotatable cable reel comprises two rotatable cable reels.

* * * * *